US012122385B1

(12) United States Patent
Takada et al.

(10) Patent No.: US 12,122,385 B1
(45) Date of Patent: Oct. 22, 2024

(54) VEHICLE CONTROL DEVICE AND METHOD

(71) Applicant: Honda Motor Co., Ltd., Tokyo (JP)

(72) Inventors: Ryo Takada, Tokyo (JP); Katsuhito Kambe, Tokyo (JP); Kazuya Moriyama, Tokyo (JP); Naoki Tsuchiya, Tokyo (JP); Fumitaka Abe, Tokyo (JP); Yosuke Horiuchi, Tokyo (JP); Yurina Morimoto, Tokyo (JP); Taichi Kitamura, Tokyo (JP); Shun Saigusa, Tokyo (JP); Ikuo Nonaga, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/583,798

(22) Filed: Feb. 21, 2024

(30) Foreign Application Priority Data

Mar. 29, 2023 (CN) .......................... 202310318193.4

(51) Int. Cl.
*B60W 10/10* (2012.01)
*B60W 10/18* (2012.01)
(Continued)

(52) U.S. Cl.
CPC ...... *B60W 30/18181* (2013.01); *B60W 10/10* (2013.01); *B60W 10/182* (2013.01);
(Continued)

(58) Field of Classification Search
CPC ........... B60W 30/18181; B60W 10/10; B60W 10/182; B60W 30/18118; B60W 30/182; B60W 2510/1005; B60W 2510/104; B60W 2520/10; B60W 2540/12; B60W 2540/16; B60W 2552/15; B60W 2710/186; B60W 2710/182; B60W 2710/10; F16H 59/105; B60T 7/105
(Continued)

(56) References Cited

U.S. PATENT DOCUMENTS 5,696,679 A * 12/1997 Marshall ............. F16H 63/3416
701/1
9,233,666 B2 * 1/2016 Al-Regib .............. B60W 10/18
(Continued)

FOREIGN PATENT DOCUMENTS

JP 2009166656 7/2009

*Primary Examiner* — Roger L Pang
(74) *Attorney, Agent, or Firm* — JCIPRNET

(57) ABSTRACT

The disclosure provides a vehicle control device and method for controlling a vehicle. The vehicle control device includes a gear shift member, having a parking brake keeping a vehicle in a stationary state, a drive gear keeping driving the vehicle, and a park gear keeping the vehicle in a parked state; a control switch configured to be able to control the parking brake and shift to the park gear; a control member performing following controls when the vehicle is in the parked state: when the control switch is operated for a period of time shorter than a prescribed time, the control member shifts to the park gear and executes linked parking that links an operation of the parking brake, and during the execution of the linked parking, when the control switch is operated for a period of time longer than the prescribed time, the control member releases the parking brake.

10 Claims, 4 Drawing Sheets

(51) Int. Cl.
*B60W 30/18* (2012.01)
*F16H 59/10* (2006.01)

(52) U.S. Cl.
CPC ..... *B60W 30/18118* (2013.01); *F16H 59/105* (2013.01); *B60W 2520/10* (2013.01); *B60W 2540/16* (2013.01); *B60W 2552/15* (2020.02); *B60W 2710/10* (2013.01); *B60W 2710/186* (2013.01)

(58) Field of Classification Search
USPC .......................... 701/66, 65; 477/92, 93, 188
See application file for complete search history.

(56) References Cited

U.S. PATENT DOCUMENTS

| | | | | |
|---|---|---|---|---|
| 11,834,044 B2* | 12/2023 | Koh | ........................ | F16H 59/18 |
| 2010/0048352 A1* | 2/2010 | Yamamoto | ................ | B60T 7/12 |
| | | | | 477/92 |
| 2010/0326787 A1* | 12/2010 | Giefer | .................... | B60T 7/085 |
| | | | | 192/220.2 |
| 2013/0252784 A1* | 9/2013 | Kinoshita | ............... | F16H 61/12 |
| | | | | 477/92 |

\* cited by examiner

VEHICLE CONTROL DEVICE AND METHOD

CROSS-REFERENCE TO RELATED APPLICATION

This application claims the priority benefit of Chinese application no. 202310318193.4, filed on Mar. 29, 2023. The entity of the above-mentioned patent application is hereby incorporated by reference herein and made a part of this specification.

BACKGROUND

Technical Field

The disclosure relates to a vehicle control device and method.

Description of Related Art

In a known control method, a gear shifter is disposed on a steering column, and when the gear shifter is set to a park gear, an electronic parking brake (EPB) switch also operates in linkage.

To improve the operability of a driver, for instance, it is under consideration to remove switch-type components from the center console and integrate the gear shifter and the EPB switch into a one-way switch. However, the integration into the one-way switch unlikely allows a "pulling" operation (a releasing operation) carried out by the existing EPB switch.

Patent Document 1 (Japan patent application laid-open no. 2009-166656 A) describes a brake control system capable of applying a sufficient braking force to halt a vehicle when engaging a parking brake while the vehicle is in motion. In the related art, a dedicated switch (e.g., an EPB switch) activates the parking brake at low vehicle speeds, while a control to decelerate the vehicle is executed at high speeds. This approach relies on the recognition of the user to operate the parking brake switch, leading to the vehicle engaging the parking brake or a braking brake based on the vehicle speed. However, this is different from the user's intention (deceleration/stop).

Moreover, without prompting the user to perform complex operations, in vehicles which lack a dedicated parking brake switch, e.g., vehicles where the park gear (the P gear) switch of the gear shifter and the parking brake switch are integrated to minimize driver operations, there is a room for enhancement in achieving behavior aligned with the driver's intention, even when using a switch with functions beyond the parking brake.

SUMMARY

The disclosure relates to a vehicle control device that resolves the above-mentioned issue by changing its operation based on a duration of a driver's operation on a one-way switch.

According to an embodiment of the disclosure, a vehicle control device configured to control a vehicle is provided. The vehicle control device includes a gear shift member, having a parking brake which keeps the vehicle in a stationary state, a drive gear which keeps driving the vehicle, and a park gear which keeps the vehicle in a parked state; a control switch, disposed at the gear shift member and configured to be able to control the parking brake and shift to the park gear; a control member, configured to perform following controls when the vehicle is in the parked state. When the control switch is operated for a period of time shorter than a prescribed time, the control member shifts to the park gear and executes linked parking that is linked to an operation of the parking brake; during the execution of the linked parking, when the control switch is operated for a period of time longer than the prescribed time, the control member releases the parking brake.

According to an embodiment of the disclosure, in the vehicle control device, the control member has a single operation mode which allows an exclusive operation of the parking brake. The vehicle control device further includes an operation terminal configured to activate the single operation mode, and when the single operation mode is activated, the control switch is operated to exclusively operate the parking brake.

According to an embodiment of the disclosure, the vehicle control device further includes a vehicle speed detection member detecting a current vehicle speed of the vehicle. When the vehicle speed detection member detects that the vehicle speed is lower than a speed threshold, or when the vehicle is in the parked state, the control member is capable of selecting the single operation mode.

According to an embodiment of the disclosure, the vehicle control device further includes a slope detection member configured to detect a slope of a road surface and a hydraulic pressure maintaining member configured to maintain a hydraulic pressure generated based on a driver's operation on a brake pedal. When the slope detection member detects the slope is greater than a slope threshold, and when the control switch is operated, the hydraulic pressure maintaining member maintains the hydraulic pressure until the linked parking ends.

According to an embodiment of the disclosure, the vehicle control device further includes a gear state detection member configured to detect a selected gear mode of the gear shift member. When the vehicle is started, the slope detection member detects the slope is greater than the slope threshold, and the gear state detection member detects a shift to a gear mode other than the park gear, the linked parking is released, and the hydraulic pressure maintaining member maintains the hydraulic pressure until the release of the linked parking ends.

According to another embodiment of the disclosure, a vehicle control method for controlling a vehicle is provided. The vehicle control device includes a gear shift member having a parking brake which keeps the vehicle in a stationary state, a drive gear which keeps driving the vehicle, and a park gear which keeps the vehicle in a parked state and a control switch disposed at the gear shift member and configured to be able to control the parking brake and shift to the park gear. The vehicle control method comprises shifting to the park gear and executing linked parking that is linked to an operation of the parking brake when the control switch is operated for a period of time shorter than a prescribed time, and releasing the parking brake when the control switch is operated for a period of time longer than the prescribed time during the execution of the linked parking.

According to the another embodiment of the disclosure, the vehicle control method has a single operation mode which exclusively allows the operation of the parking brake, and the vehicle control method further comprises activating the single operation mode and operating the control switch to exclusively operate the parking brake when the single operation mode is activated.

According to the another embodiment of the disclosure, the vehicle control method further includes detecting a current vehicle speed of the vehicle; if the vehicle speed is lower than a speed threshold, or if the vehicle is in the parked state, selecting the single operation mode.

According to the another embodiment of the disclosure, the vehicle control method further includes detecting a slope of a road surface; when the slope is greater than a slope threshold and when the control switch is operated, maintaining the hydraulic pressure of the parking brake until the linked parking ends.

According to the another embodiment of the disclosure, the vehicle control method further includes detecting a selected gear mode of the gear shift member; when the vehicle is started, the slope is greater than the slope threshold, and a shift to a gear mode other than the park gear is detected, releasing the linked parking; maintaining the hydraulic pressure until the release of the linked parking ends.

In one or more of the embodiments of the disclosure, the operation of the parking brake and the shift to the park gear are integrated into one single control switch. When the control switch is pressed for the prescribed time, together with the shift to the park gear, the parking brake operates in linkage, which may reduce the number of parts requiring the driver's operation and keep the maintainability (serviceability) required by the vehicle.

DESCRIPTION OF THE EMBODIMENTS

Figure 1:
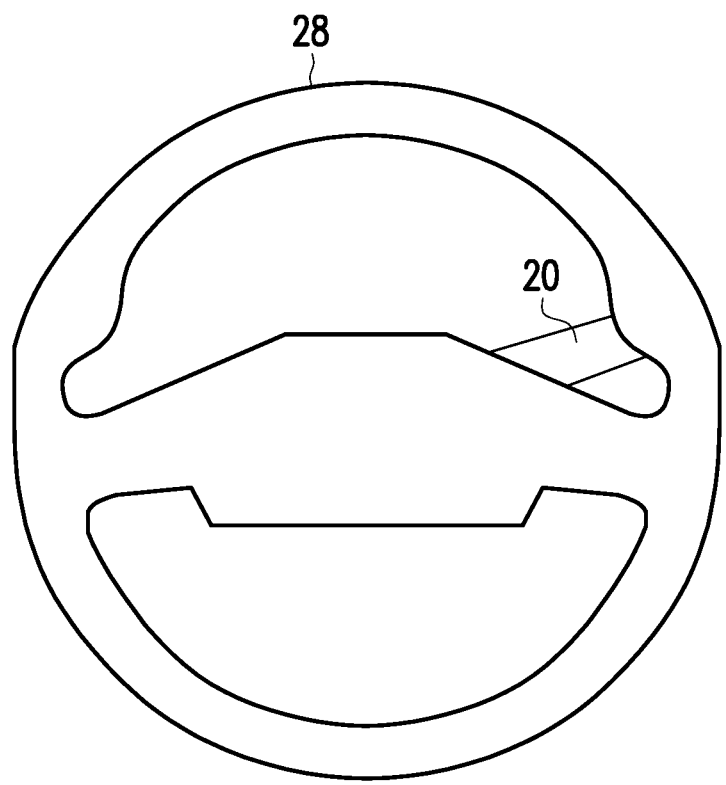
FIG. 1 exemplarily illustrates a placement of a steering wheel and a gear shifter of a vehicle.

Reference will now be made in detail to the exemplary embodiments of the disclosure, examples of which are illustrated in the accompanying drawings. Wherever possible, the same reference numbers are used in the drawings and the description to refer to the same or similar parts.

Figure 2:
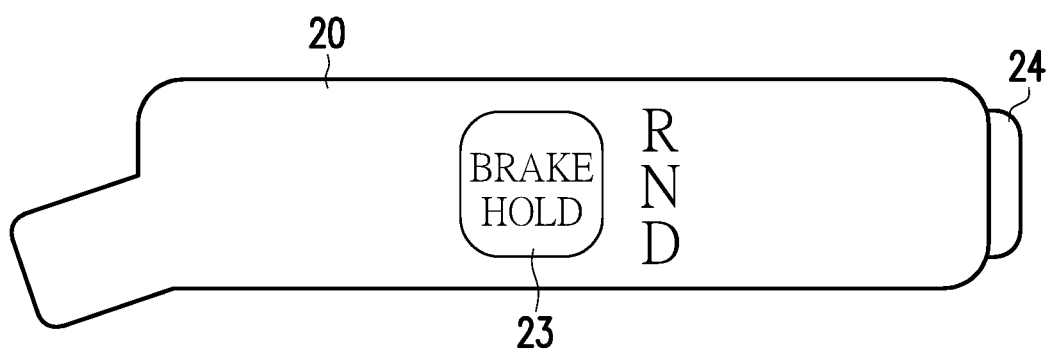
FIG. 2 exemplarily illustrates a placement of the gear shifter according to an embodiment of the disclosure.
Figure 3:
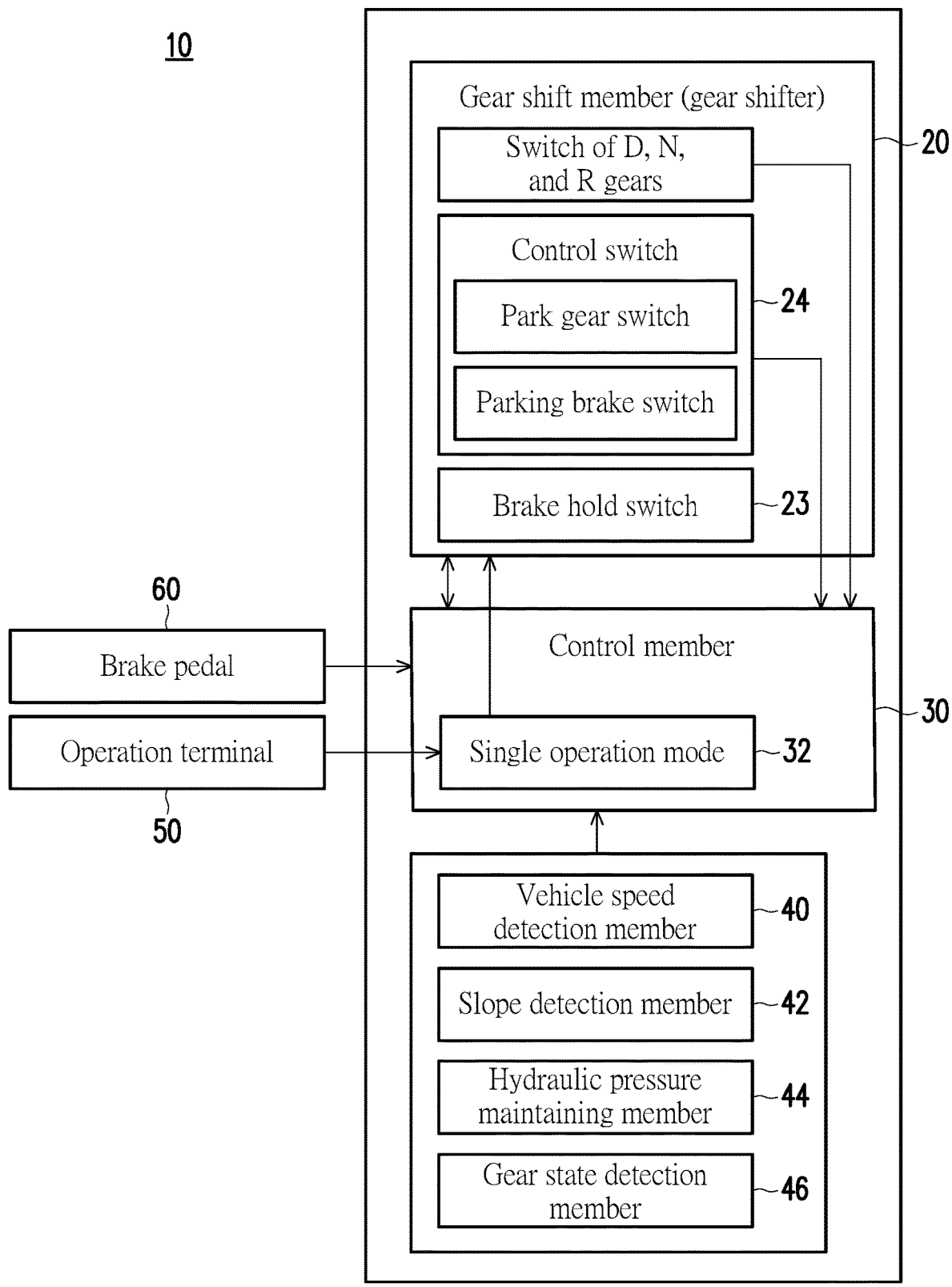
FIG. 3 illustrates a schematic block diagram of a vehicle control device according to an embodiment of the disclosure.

FIG. 1 shows an example of a placement of a steering wheel and a gear shifter of a vehicle. FIG. 2 shows an example of a placement of the gear shifter according to an embodiment of the disclosure. FIG. 3 shows a schematic block diagram of a vehicle control device according to an embodiment of the disclosure.

As shown in FIG. 1, a gear shifter (also known as a gear shift member) 20 of a vehicle is disposed at a steering column (not shown) where a steering wheel 28 of the vehicle is mounted, which is simply an exemplary embodiment, and the gear shifter 20 may also be placed at other locations convenient for a driver's operation, which should not be construed as a limitation in the disclosure.

As shown in FIG. 2 and FIG. 3, the gear shifter 20 includes functions of a parking brake switch EPBSW (executed by a control switch 24) and a park gear switch PSW (executed by the control switch 24). The parking brake is configured to keep the vehicle in a stationary state, preventing the vehicle from moving. The park gear is to maintain the vehicle in a parked position.

Here, the gear shifter 20 of a typical automatic transmission vehicle may at least include a drive gear (D), a neutral gear (N), and a reverse gear (R) for driving the vehicle. A gear shift of the gear shifter 20 is, for instance, performed by operating the gear shifter 20 to switch among the D, N, and R gears. The shift to these gears of the gear shifter 20 may be implemented in any existing manner and should not be construed as a limitation in the disclosure.

Besides, the gear shifter 20 may also include a brake hold switch 23. A brake hold refers to a type of automatic parking hold system. The brake hold switch 23 may be implemented in any existing manner and should not be construed as a limitation to the disclosure.

According to an embodiment of the disclosure, the gear shifter 20 includes one control switch 24, which is structured to control the EPB and the operation of shifting to a park gear (P). In other words, the control switch 24 may perform the operation of the parking brake switch EPBSW and the park gear switch PSW, which is mainly determined by a duration of pressing the control switch 24.

As shown in FIG. 3, the vehicle control device 10 provided in an embodiment of the disclosure additionally includes a control member 30. The control member 30 is, for instance, a processor that controls the overall operation of the vehicle and may be implemented by an electronic control member (ECU), for instance. In this embodiment, the parking control will be elaborated, while the description of other control parts is omitted. According to the embodiment of the disclosure, the control member 30, for instance, controls the control switch 24 and enables the control switch 24 to execute the operation of the EPB and the operation of shifting to the park gear (P gear).

When the control member 30 receives pressing information of the control switch 24, especially the pressing time, the control member 30 may compare the pressing time with a prescribed time and accordingly control the parking appropriately. According to this embodiment, when the driver operates (in this case, presses) the control switch 24 for a period of time shorter than the prescribed time, the control member 30 performs the following operations, i.e., shifting to the park gear (P gear) and executing linked parking by activating the EPB in linkage, thereby securing the vehicle. Besides, during the execution of linked parking, when the control switch 24 is operated for a period of time longer than the prescribed time, the control member 30 releases the EPB, allowing the vehicle to be prepared for driving (forward, backward, and so on).

As a result, in an embodiment of the disclosure, one control switch 24 is required for performing the linked parking during parking or releasing of the EPB switch, and it is not necessary to use two switches, i.e., the park gear switch PSW and the parking brake switch EPBSW. In this embodiment, one control switch 24 is required to be set, and by setting different pressing methods, the control switch 24 may perform two types of parking functions.

In light of the foregoing, the operation of the EPB and the shift to the park gear (P gear) are integrated into one single control switch. When the control switch is pressed for the prescribed time, the EPB operates in linkage together with the shift to the P gear, which may reduce the number of parts requiring the driver's operation and keep the maintainability and commerciality required by the vehicle.

Additionally, according to an embodiment of the disclosure, the control member 30 of the vehicle control device 10 may also have a single operation mode 32. Here, the single operation mode exclusively allows the operation of the EPB. Although the parking brake switch EPBSW and the park gear switch PSW are integrated into one single control switch 24 in the disclosure, under certain specific circumstances, it is necessary for the control switch 24 to exclusively perform one single operation function.

The vehicle control device 10 may be equipped with an operation terminal 50. In an embodiment of the disclosure, the operation terminal 50 may be a center information display (CID). Through the operation terminal 50, the single operation mode 32 of the control member 30 may be activated. When the single operation mode 32 is activated, the control switch 24 may exclusively perform one single function, and at this time the function of the park gear switch PSW is disabled, and the control switch 24 is equivalent to the EPB switch EPBSW.

In the above example, when the single operation mode 32 is activated, information indicating that a linked parking control mode is disabled may be displayed on a display portion of the vehicle, making it noticeable to the driver. The display portion may be, for instance, a center information display (CID).

On such a condition, during testing or other inspections of vehicles, there are inspection items that exclusively require testing a braking force of the EPB and a towing mode (preventing the vehicle from sliding down a slope by applying the EPB). Therefore, by providing a special mode that changes behavior after operating the control switch 24 (exclusively allowing the EPB to operate), the vehicle may be operated according to the driver's intention, thereby improving the operability of the vehicle.

Besides, according to an embodiment of the disclosure, the vehicle control device 10 may additionally include a vehicle speed detection member 40, which is configured to detect a current vehicle speed of the vehicle. The vehicle speed may be obtained by detecting a rotation speed by means of a sensor disposed near a wheel of the vehicle. The vehicle speed may also be detected by applying various available sensors, such as performing an image analysis processing after shooting the image with a camera, through radar, through lidar, and other available technical means, which should not be construed as limitations to the disclosure.

Based on the vehicle speed detected by the vehicle speed detection member 40, when the vehicle speed is lower than the speed threshold, or when the vehicle is in the parked state (the vehicle speed is 0), the control member 30 may select the single operation mode 32.

When the control switch 24 is changed to the single operation mode 32, a potential threat to vehicle control may arise. Therefore, to preclude the driver from accidentally contacting the operation terminal 50 and inadvertently activating the single operation mode 32 during the driving of the vehicle, a safety mechanism must be in place to prevent misoperation. According to an embodiment of the disclosure, a vehicle speed threshold is established, such as, for instance, above 10 km/h, so that when the vehicle speed exceeds this threshold, the vehicle may be assumed to be in motion at a high speed (relative to the parked state). At this time, it is necessary to deactivate the operation terminal 50. In this scenario, even if the driver unintentionally engages with the operation terminal 50, the control member 30 does not activate the single operation mode 32.

Therefore, according to this embodiment, by establishing the conditions for activating the single operation mode 32 (i.e., the vehicle speed limit), the selection of the single operation mode 32 is precluded when these specified limitation conditions are satisfied. As such, even in the event of the driver unintentionally engaging with the operation terminal 50, the mode change is averted, thereby mitigating circumstances arising from the driver's unintentional misoperation.

Besides, according to an embodiment of the disclosure, the vehicle control device 10 may additionally include a slope detection member 42 and a hydraulic pressure maintaining member 44. The slope detection member 42 is configured to detect a slope of a road surface where the vehicle is located. The hydraulic pressure maintaining member 44 is configured to maintain a hydraulic pressure generated because of a driver's operation on a brake pedal (BP) 60. The hydraulic pressure may be applied to maintain the operation of the brake of the vehicle.

When the slope detection member 42 detects the slope exceeding the slope threshold, and the control switch 24 is operated, the hydraulic pressure maintaining member 55 continues to maintain the hydraulic pressure until the linked parking ends, so as to provide the braking force of the brake to the vehicle.

Figure 4:
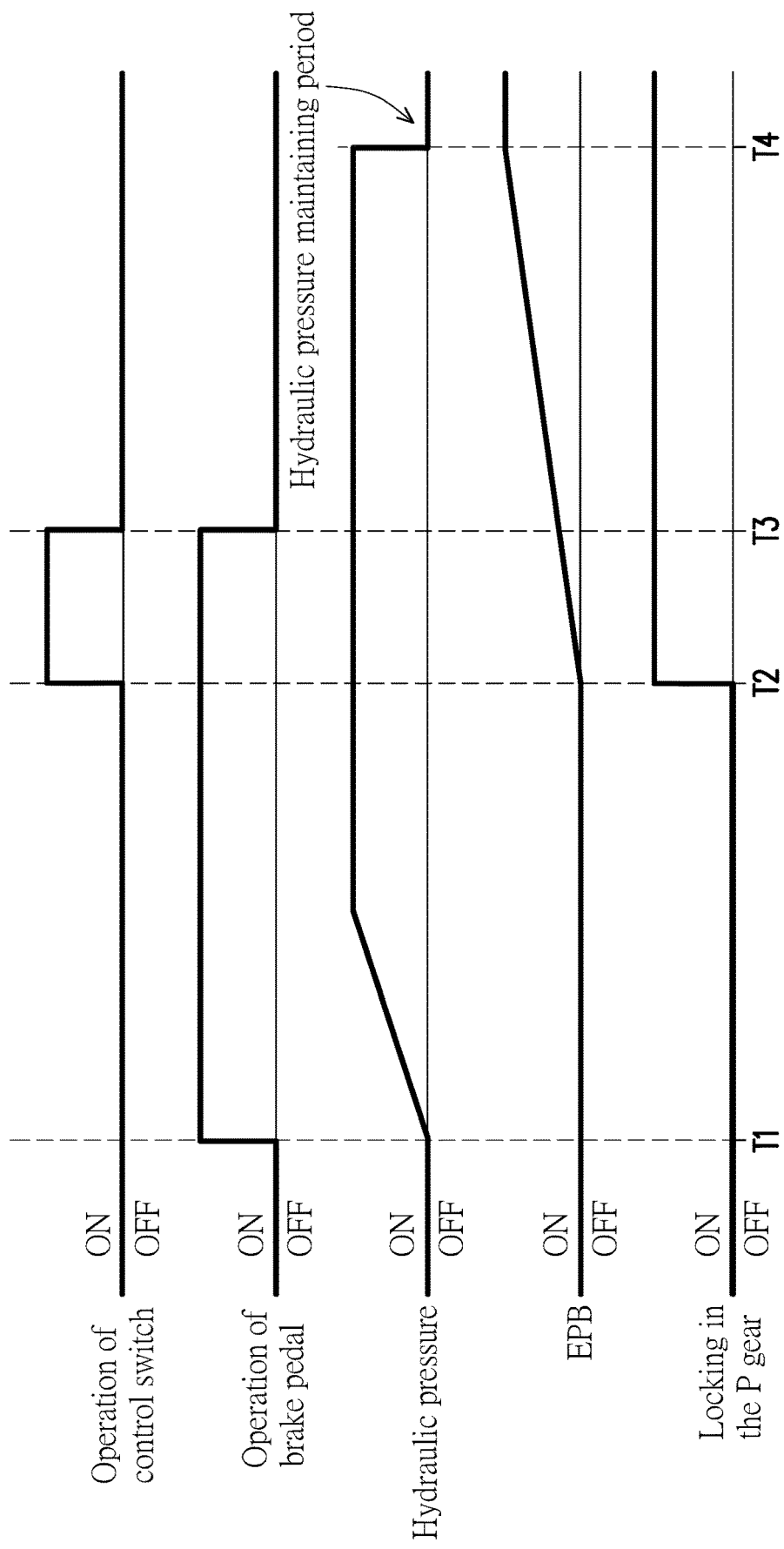
FIG. 4 illustrates a timing diagram of a linked parking operation of the vehicle control device on a slope according to an embodiment of the disclosure.

As shown in FIG. 4, which illustrates a scenario that the vehicle control device is located on a slope of a road surface greater than the sloe threshold, at a time point T1, the driver steps on the BP 60, and the hydraulic pressure of the brake begins to be supplied and gradually increases to a stable value (an ON state), so as to provide the braking force of the brake.

Next, at a time point T2, the driver of the vehicle presses the control switch 24 for a period of time (time points T2-T3), during which the P gear is locked and thereby the parking brake begins to operate, so as to perform linked parking.

Subsequently, at a time point T3, the operation of the control switch 24 is stopped (an OFF state), and the driver also releases the BP 60 (the OFF state). Then, after a time point T4, the operation of the parking brake switch ends, and the P gear is also locked. At this time, the operation of the parking brake switch EPBSW and the operation of locking in the park gear (P gear) are completed, and by this time point T4, the hydraulic pressure maintaining member 44 continues to maintain the hydraulic pressure (the ON state). after the time point T4, the maintenance of the hydraulic pressure ends.

Moreover, the vehicle control device 10 may further include a gear state detection member 46. The gear state detection member 46 is configured to detect a selected gear mode (DNRP) of the gear shift member 20. When the vehicle is started, if the slope detection member 42 detects the slope exceeding the slope threshold (including uphill or downhill), and when the gear state detection member 45 detects a shift to a gear mode other than the park gear (P) (e.g., DNR gear modes), the control member 30 releases the linked parking operation of the control switch 24. Until the release of the linked parking is completed, the hydraulic pressure maintaining member 44 continues to maintain the hydraulic pressure.

When the vehicle is parked on a steep slope, and when the driver of the vehicle intends to drive away from this position (engaging the D gear, the R gear, or even the N gear), if the EPB is suddenly released, the braking force of the EPB is reduced, which may potentially cause the vehicle to slide down.

Figure 5:
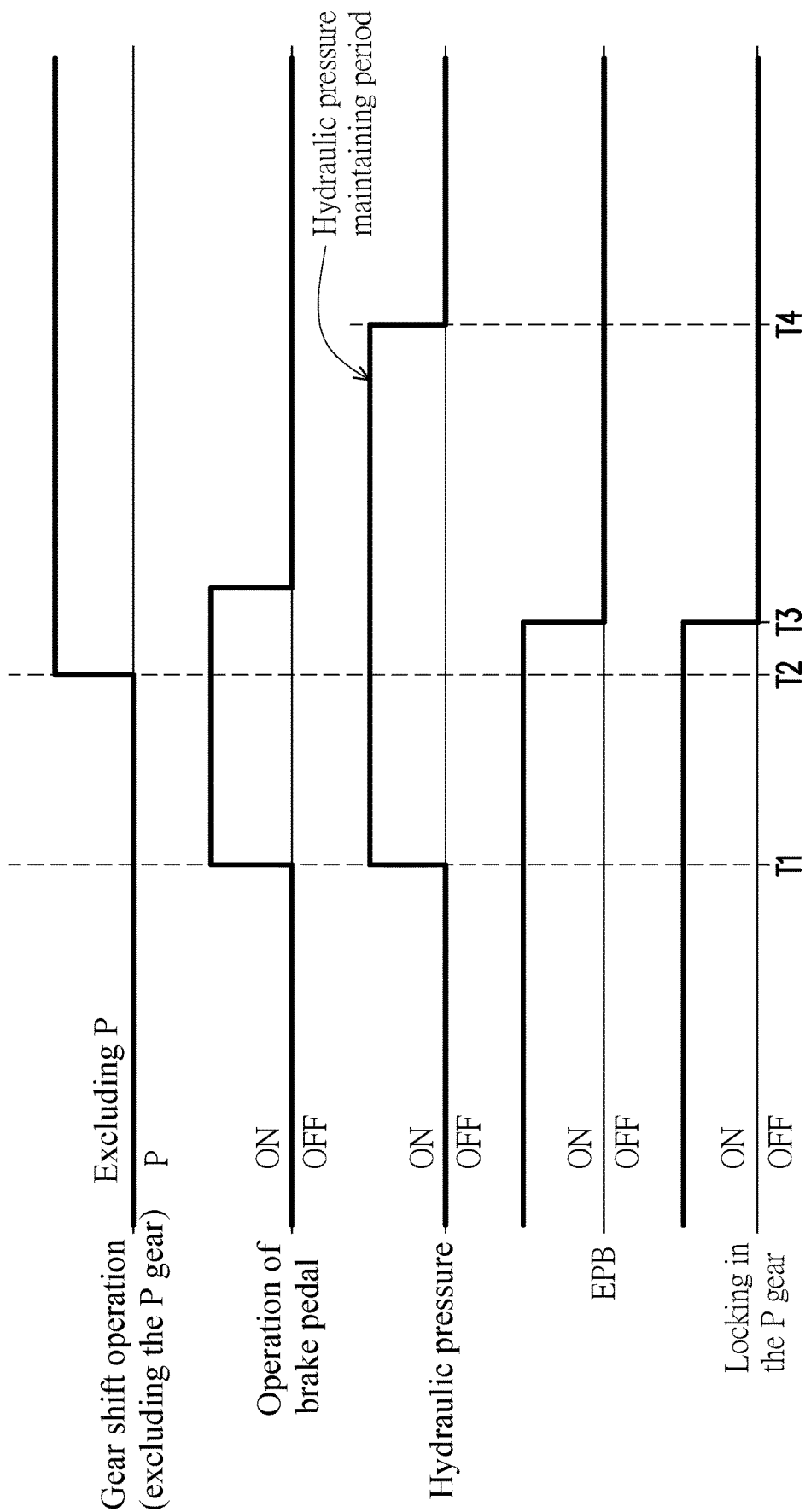
FIG. 5 illustrates a timing diagram of releasing the linked parking operation of the vehicle control device on a slope according to an embodiment of the disclosure.

As shown in FIG. 5, which illustrates a scenario that the slope of the road surface where the vehicle is located is above the slope threshold and the driver is about to drive the vehicle, at the time point T1, the driver steps on the BP 60, and the hydraulic pressure of an electric servo brake (ESB) is in the ON state to provide the braking force of the brake. As such, the driver may stabilize the vehicle through the BP 60 when releasing the parking. At this time, the EPB remains in operation (in the ON state), and the park gear (P gear) is also in a locked state (the ON state).

Next, at the time point T2, the driver of the vehicle shifts the gear mode of the vehicle from the park gear (P gear) to a gear other than the park gear (P gear), such as the D gear, the N gear, or the R gear, through the gear shift member 20, so as to change the vehicle to be in a drivable state.

After that, at the time point T3, the driver presses the control switch 24 and releases the linked parking state, which is linked to the operation of the parking brake to become OFF, and the locked state of the park gear (P gear) is also released.

Subsequently, the hydraulic pressure is continuously maintained in the ON state until the time point T4 at which both the operation of the EPB and the operation of unlocking the park gear (P gear) are completed. After the time point T4, the state of maintaining the hydraulic pressure is released.

As such, after the linked parking is released, when the driver of the vehicle shifts to the D gear or the R gear and prepares to drive the vehicle, the hydraulic pressure may still be kept for a period of time to maintain the braking force of the vehicle, so as to prevent the vehicle from sliding down the slope.

According to this embodiment, when the vehicle is parked on the slope, the EPB takes time to completely function. If the driver ends the hydraulic braking when the driver stops operating the brake pedal BP, backlash may occur, and the vehicle may slide down the slope. Therefore, by maintaining the hydraulic pressure of the BP 60 until the EPB functions and the operation of locking in the park gear (P gear) is completed, backlash may be suppressed, and passenger discomfort may be prevented.

Lastly, it should be mentioned that the above embodiments simply serve to illustrate but not to limit the technical solutions provided in the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A vehicle control device, configured to control a vehicle and comprising:
   a gear shift member, having a parking brake which keeps the vehicle in a stationary state, a drive gear which keeps driving the vehicle, and a park gear which keeps the vehicle in a parked state;
   a control switch, disposed at the gear shift member and configured to be able to control the parking brake and shift to the park gear;
   a control member, wherein in the case that the vehicle is in the parked state, the control member is configured to:
   in the case that the control switch is operated for a period of time shorter than a prescribed time, shift to the park gear and execute linked parking that is linked to an operation of the parking brake;
   during the execution of the linked parking, in the case that the control switch is operated for a period of time longer than the prescribed time, release the parking brake.

2. The vehicle control device according to claim 1, wherein
   the control member has a single operation mode which exclusively operates the parking brake,
   the vehicle control device further includes an operation terminal configured to activate the single operation mode, and
   in the case that the single operation mode is activated, the control switch is operated to exclusively operate the parking brake.

3. The vehicle control device according to claim 2, further comprising:
   a vehicle speed detection member, detecting a current vehicle speed of the vehicle,
   wherein in the case that the vehicle speed detection member detects that the vehicle speed is lower than a speed threshold, or in the case that the vehicle is in a parked state, the control member is capable of selecting the single operation mode.

4. The vehicle control device according to claim 1, further comprising:
   a slope detection member, configured to detect a slope of a road surface; and
   a hydraulic pressure maintaining member, configured to maintain a hydraulic pressure generated based on a driver's operation on a brake pedal,
   wherein in the case that the slope detection member detects the slope is greater than a slope threshold, and in the case that the control switch is operated, the hydraulic pressure maintaining member maintains the hydraulic pressure until the linked parking ends.

5. The vehicle control device according to claim 4, further comprising:
   a gear state detection member, configured to detect a selected gear mode of the gear shift member,
   wherein in the case that the vehicle is started, the slope detection member detects the slope is greater than the slope threshold, and the gear state detection member detects a shift to a gear mode other than the park gear, the linked parking is released, and the hydraulic pressure maintaining member maintains the hydraulic pressure until the release of the linked parking ends.

6. A vehicle control method for controlling a vehicle, wherein a vehicle control device of the vehicle comprises: a gear shift member, having a parking brake which keeps the vehicle in a stationary state, a drive gear which keeps driving the vehicle, and a park gear which keeps the vehicle in a parked state, and a control switch, disposed at the gear shift member and configured to be able to control the parking brake and shift to the park gear, the vehicle control method comprising:
   in the case that the control switch is operated for a period of time shorter than a prescribed time, shifting to the park gear and executing linked parking that is linked to an operation of the parking brake; and
   during the execution of the linked parking, in the case that the control switch is operated for a period of time longer than the prescribed time, releasing the parking brake.

7. The vehicle control method according to claim 6, wherein the vehicle control method has a single operation mode which exclusively allows the operation of the parking brake, the vehicle control method further comprising:

activating the single operation mode; and in the case that the single operation mode is activated, operating the control switch to exclusively operate the parking brake.

8. The vehicle control method according to claim 7, further comprising:

detecting a current vehicle speed of the vehicle;

if the vehicle speed is lower than a speed threshold, or if the vehicle is in the parked state, selecting the single operation mode.

9. The vehicle control method according to claim 6, further comprising:

detecting a slope of a road surface; and in the case that the slope is greater than a slope threshold and the control switch is operated, maintaining the hydraulic pressure of the parking brake until the linked parking ends.

10. The vehicle control method according to claim 9, further comprising:

detecting a selected gear mode of the gear shift member;

in the case that the vehicle is started, the slope is greater than the slope threshold, and a shift to a gear mode other than the park gear is detected, releasing the linked parking; and maintaining the hydraulic pressure until the release of the linked parking ends.

* * * * *